United States Patent
Lingelbach et al.

(10) Patent No.: US 7,178,356 B1
(45) Date of Patent: Feb. 20, 2007

(54) FREEZER ARRANGEMENT

(76) Inventors: Fredric John Lingelbach, P.O. Box 609, Elkhorn, NE (US) 68022; John Fredric Lingelbach, P.O. Box 609, Elkhorn, NE (US) 68022

( * ) Notice: Subject to any disclaimer, the term of this patent is extended or adjusted under 35 U.S.C. 154(b) by 221 days.

(21) Appl. No.: 11/052,414

(22) Filed: Feb. 7, 2005

Related U.S. Application Data

(60) Provisional application No. 60/543,173, filed on Feb. 10, 2004.

(51) Int. Cl.
 *F25D 17/04* (2006.01)
(52) U.S. Cl. ...................................................... 62/407
(58) Field of Classification Search .................. 62/407, 62/408, 419, 380; 165/104.18, 104.22
 See application file for complete search history.

(56) References Cited

U.S. PATENT DOCUMENTS

| | | |
|---|---|---|
| 2,607,201 A | 8/1952 | Kleist |
| 3,648,753 A | 3/1972 | Bergquist |
| 4,056,950 A | 11/1977 | Kaufman, Jr. |
| 4,325,221 A | 4/1982 | Grewar |
| 4,367,630 A | 1/1983 | Bernard et al. |
| 4,487,035 A | 12/1984 | Greener |
| 5,452,588 A | 9/1995 | Onodera |
| 5,826,432 A | 10/1998 | Ledbetter |
| 6,235,332 B1 * | 5/2001 | Arnason ..................... 426/524 |
| 6,796,142 B2 | 9/2004 | Burn |
| 2003/0041614 A1 | 3/2003 | Burn |

* cited by examiner

*Primary Examiner*—Melvin Jones

(57) ABSTRACT

A freezer arrangement includes a room having a storage area and a blast cell, with the volume of the storage area being greater than the volume of the blast cell. Frozen food product is positioned in the storage area. A refrigeration unit draws air from the storage area and through the blast cell to rapidly freeze the unfrozen food product. Air from the blast cell is chilled and blown back into the storage area. A method for rapidly freezing unfrozen food product includes providing a room with a large storage area and a smaller blast cell. Unfrozen food product is loaded into the blast cell and a refrigeration unit is operated to draw air from the large storage area, through the blast cell, chill the air, and exhaust the chilled air into the storage area, until the food product in the blast cell is cooled to a predetermined temperature.

16 Claims, 2 Drawing Sheets

FREEZER ARRANGEMENT

CROSS-REFERENCES TO RELATED APPLICATIONS

Applicants claim the benefit of U.S. Provisional Application Ser. No. 60/543,173, filed Feb. 10, 2004.

STATEMENT AS TO RIGHTS TO INVENTIONS MADE UNDER FEDERALLY SPONSORED RESEARCH AND DEVELOPMENT (Not applicable)

INCORPORATION-BY-REFERENCE OF MATERIAL SUBMITTED ON A COMPACT DISC (Not applicable)

BACKGROUND OF THE INVENTION (1) Field of the Invention

The present invention relates generally to apparatus for the rapid freezing of food products, and more particularly to an improved method and apparatus for blast freezing and storage of food products.

(2) Description of Related Art

Traditionally, freezers and blast freezers in industrial plants have been separated. Freezers consist of refrigeration units having sufficient storage shelves, racks, and/or pallets for holding frozen product and maintaining the frozen product in a frozen condition. Freezers are found in a wide variety of sizes, from the small units forming a portion of a household refrigerator, to large walk-in rooms with overhead cranes, pallets, and forklifts for moving product about the room.

Blast freezers are specially designed freezers that are adapted to freeze unfrozen product within a shorter time period than simply placing the product into a traditional freezer. The blast freezing process has developed along several different lines in the prior art, but all utilize the flow of chilled gas as a component of the method. For example, U.S. Pat. No. 4,325,221 to Grewar discloses a method of freezing animal carcasses by first spraying the carcass with liquid nitrogen, and thence moving the carcass through a forced draught cooling system. Similarly, U.S. Pat. No. 4,367,630 to Bernard et al. discloses a system for rapidly chilling warm carcasses wherein the carcasses are first immersed in a cryogenic fluid and thence positioned in a chamber with sub-freezing gas circulated around the carcasses.

A continuous throughput blast freezer is disclosed in US Patent Application Publication No. 2003/0041614 to Burn, which uses a forced air chiller to rapidly freeze warm food products. Similarly, a forced air chiller is used to rapidly freeze food in U.S. Pat. No. 4,056,950 to Kaufman, Jr.; U.S. Pat. No. 5,452,588 to Onodera; and U.S. Pat. No. 5,826,432 to Ledbetter.

All of these patents disclose the use of a blast freezer in an area completely separate from storage areas for frozen food products. In most instances, the blast chamber is located in a completely different room, or within a separate enclosure sealed from the surrounding room. While this arrangement is effective for rapidly freezing the food products, it requires two separate sets of refrigeration equipment to operate—one set for the blast freezing process and one set for the storage of frozen food product. This use of two sets of refrigeration equipment is not only expensive to operate, but is also quite labor intensive for maintenance and repair considerations.

BRIEF SUMMARY OF THE INVENTION

It is therefore a general object of the present invention to provide an improved apparatus and method for blast freezing and storage of food products.

Another object is to provide a blast freezer and storage freezer arrangement and method that is less expensive to build, operate and maintain than conventional blast freezing and storage facilities.

These and other objects will be apparent to those skilled in the art.

The apparatus for blast freezing and storage of food products of the present invention includes an enclosed room with a volume designated as a storage area and a volume designated as a blast cell. The volume of the storage area is substantially greater than the volume of the blast cell, and is preferably at least 2–20 times or more greater in volume. Frozen food product is positioned in the storage area for storage and to serve as a heat sink for the blast freezing process of the blast cell. A refrigeration unit draws air from the storage area, which is directed through the blast cell to rapidly freeze unfrozen food product positioned in the blast cell. Air from the blast cell is drawn through the refrigeration unit, where the air is chilled and distributed and diffused into the storage area.

The method for rapidly freezing unfrozen food product of the present invention includes the initial step of providing a room with a storage area and a blast cell, the volume of the storage area being substantially larger than the volume of the blast cell. The refrigeration unit is then operated to bring the entire room down to a predetermined temperature. Unfrozen food product is then loaded into the blast cell, and the refrigeration unit is operated to draw air from the storage area and thence through the blast cell, to blast freeze the unfrozen food product. The air from the blast cell is drawn through the refrigeration unit, to chill the air, and then exhausted into the storage area. The refrigeration unit is operated until the food product in the blast cell is frozen and the room reaches a predetermined temperature. The frozen food product is then moved to the storage area, to serve as an additional heat sink.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
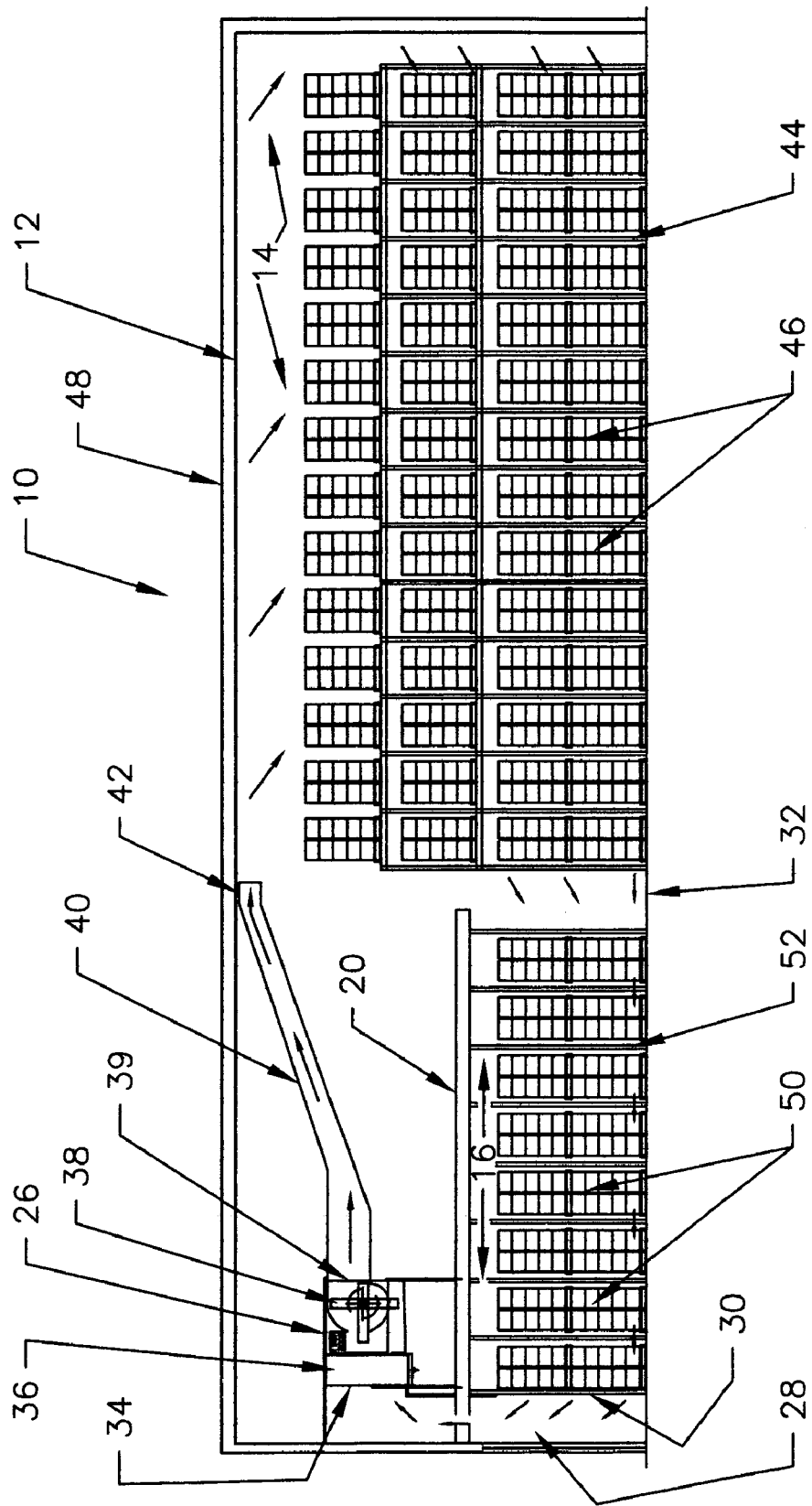
FIG. 1 is a side elevation view of a freezer arrangement of the present invention, within a single room.
Figure 2:
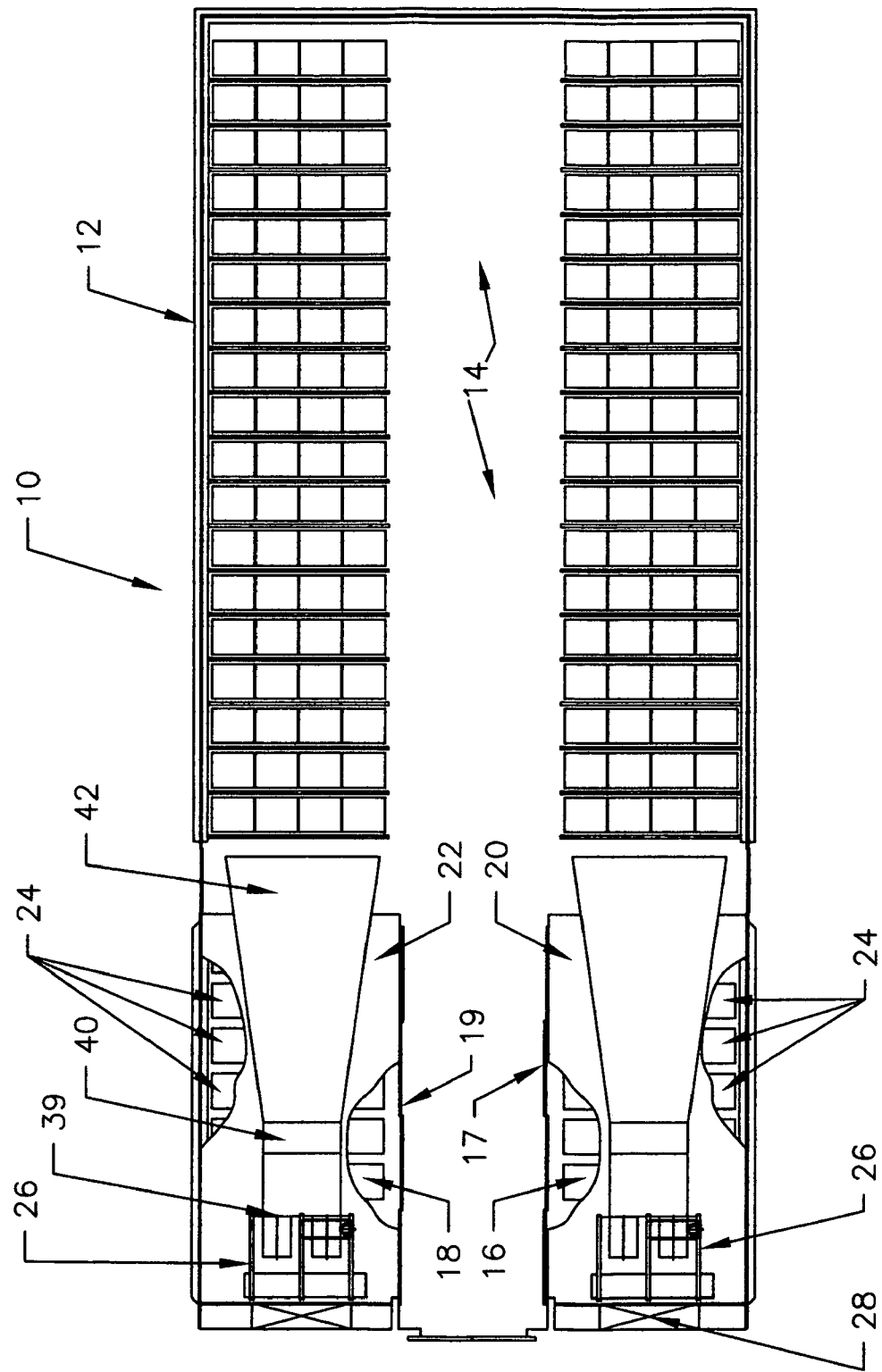
FIG. 2 is a plan view of the freezer arrangement of FIG. 1.

Referring now to the drawings, the freezer arrangement of the present invention is designated generally at 10, and is shown arranged within an enclosed room 12. Room 12 is divided into three areas, designated generally as the storage area 14 and two blast cells 16 and 18. It should be noted that storage area 14 has a volume that is much larger than the volume of either of blast cells 16 and 18.

The effective volume of blast cells 16 and 18 is delineated by a low ceiling 20 and 22 extending over the top of each blast cell 16 and 18, respectively. Ceilings 20 and 22 reduce the effective height of blast cells 16 and 18 to less than the height of storage area 14. Slide doors 17 and 19 are installed to further separate the blast cells 16 and 18, so that air flows through the unfrozen food product 50 from the ends open to storage area 14.

Because blast cells 16 and 18 are identical, only blast cell 16 and its associated evaporator unit 26 will be described in detail herein. An air plenum 28 includes an intake opening 30 located adjacent to the floor 32 of room 12, and extends upwardly therefrom, through ceiling 20 to an intake opening 34 on evaporator unit 26. Evaporator units 26 include a coil set 36 designed specifically for the size and load of room 12, including storage area 14 and both blast cells 16 and 18. A fan 38 adjacent coil set 36, draws air from plenum 28 through coil set 36 and then directs the chilled air through an exhaust port 39 and duct 40 to the storage area 14 of room 12. Preferably, a diffuser 42 is provided on the output end of duct 40 to reduce the velocity and more uniformly distribute the chilled air into storage area 14. Extensions to duct 40 may be used for rooms 12 that have a great length, so that chilled air from evaporator unit 26 reaches the far end of the room.

As discussed above, each blast cell 16 and 18 includes an air plenum 28 with an air inlet 30 located adjacent floor 32. This location assists in assuring that chilled air is circulated throughout room 12, since the inlets 30 are located as far from the end of diffusers 42 as possible. Similarly, blast cells 16 and 18 are spaced transversely apart within room 12 as far as possible. Since cold air is heavier than warm air, the location of the air inlets 30 at the level of the floor will insure that the coldest air within room 12 is drawn through blast cells 16 and 18 before entering plenums 28 and thence to the coil sets of evaporator units 26.

Another important feature of the invention is the use of the storage area 14 of room 12 to store frozen product. A plurality of palletized freezer racks 44 hold and store frozen food product 46 substantially from floor 32 to ceiling 48 of room 12. Racks 44 are of a standard variety, which permit airflow through and around the racks 44, to thereby ensure good circulation throughout storage area 14 and food product 46.

FIG. 1 shows how chilled air from diffuser 42 circulates throughout storage area 14 and through the frozen food product on storage racks 44 before entering blast cells 16 and 18. The large volume of air and frozen food product within storage area 14 acts as a huge heat sink, such that chilled air passing through warm food product 50 (product to be rapidly frozen) on palletized blast cell racks 52, will maintain a relatively low temperature and a relatively small change in temperature after passing through the blast cells 16 and 18 and into air plenums 28. The location of the air intakes 30 of plenums 28, and the use of blast cell ceilings 20 and 22, constricts the flow of air in the blast cells and thereby increases the velocity of the air flow, to cause the "blast freezing" effect required to rapidly freeze the warm food product 50. In addition, air intakes 30 are specifically located adjacent and proximal the unfrozen food product 50, so that chilled air is pulled through and circulated around the food product 50 as it is drawn into intakes 30.

In operation, the freezer 10 is partially filled with frozen food product that is to be stored for a period of time. During this start-up operation, the freezer arrangement 10 of the present invention will operate in substantially the same manner as prior systems. However, once the freezer has obtained the desired operating temperature (for example, −10° F.) the owner will quickly recognize the benefits of this invention.

Once room 12 has been brought down to the desired operating temperature, and some amount of frozen food product 46 is stored in racks 44, the air and product 46 will act as a heat sink. When unfrozen food product 50 is brought into blast cells 16 and 18 on racks 52, evaporator units 26 will be activated at full power to begin the blast freezing process. The freezer arrangement 10 will cause −10° F. freezer air to be drawn from storage area 14 and racks 44, thence through the blast freezer racks 52, thence through the air plenums 28, and into the intakes 34 of evaporator units 26, where the air is refrigerated. By using the natural heat sink of storage area 14 and frozen product 46, the −10° F. air that is being drawn through the blast freezer rack greatly decreases the required time to freeze the product being blasted. In fact, the applicants' extensive testing has shown that the freezer arrangement 10 of the present invention can decrease blast freezing times by as much as 50 percent, with very little, if any increase in main freezer temperature.

Not only are freezing times reduced by the freezer arrangement 10 of the present invention, but the arrangement also permits a single set of refrigeration equipment to be used for both the blast freezing process and for the maintenance and storage of frozen food product. This reduction in equipment (as compared to the typical arrangement of a blast freezer separate from a storage freezer) also reduces the amount of accessories, refrigerant, and associated parts and repair. Since the need for standard freezer units is eliminated, the use of the freezer arrangement of the present invention also eliminates the need for the associated piping, control valves, hand valves, installation, insulation, electrical connections, structural components, controls, and drains. As a natural consequence of eliminating freezer evaporators, overall system refrigerant inventory will consequently be reduced. This reduction is conducive to a safer operating environment for all plant personnel, as well as being safer for the surrounding natural environment.

An additional benefit of the design of the present freezer arrangement, is the location of all refrigeration units, piping, and related equipment, along one end wall of the room. This arrangement eliminates piping, wiring and other equipment in the main storage room, thereby reducing the chance of contacting and damaging the equipment during loading and unloading of the storage area. Also, maintenance is more easily performed on the equipment, without interference with the normal operations of the storage and blast areas of the room.

Whereas the invention has been shown and described in connection with the preferred embodiments thereof, many modifications, substitutions and additions may be made which are within the intended broad scope of the appended claims. For example, the refrigeration method may be of any desired type—i.e. direct expansion, liquid overfeed, flooded, etc.

What is claimed is:

1. A freezer arrangement, comprising:
    an enclosed room for freezing non-frozen food product and storing frozen food product, the room including a ceiling, floor, opposing first and second end walls and opposing side walls;
    said room including a volume designated as a storage area extending from the first end wall toward the second end wall, and a volume designated as a blast cell;

the volume of the storage area being greater than the volume of the blast cell;

frozen food product positioned in the storage area;

at least one air plenum having intake and exhaust ends, the intake end having an intake opening positioned adjacent to the second end wall within the blast cell of the room;

a refrigeration unit of the type having an air intake, a heat exchanger for chilling air from the air intake, a blower fan for moving air through the unit, and an exhaust port for dispensing chilled air from the unit, the air intake of said unit connected to the exhaust end of the air plenum, and the unit exhaust port positioned to dispense chilled air into the storage area.

2. The freezer arrangement of claim 1, wherein said blast cell has a ceiling extending within the room over a length and width of the blast cell to form a blast cell height, and wherein the height of the storage area from the floor of the room to the ceiling of the room is greater than the height of the blast cell.

3. The freezer arrangement of claim 2, wherein said exhaust port includes a duct with a distal outlet port located remote from the air plenum intake opening.

4. The freezer arrangement of claim 3, wherein said exhaust duct is located adjacent to the room ceiling.

5. The freezer arrangement of claim 4, wherein said exhaust duct includes a diffuser for diffusing chilled air dispensed therefrom.

6. The freezer arrangement of claim 5, wherein said storage area has a volume at least twice as large as the volume of the blast cell.

7. The freezer arrangement of claim 1, wherein said exhaust port includes a duct with a distal outlet port located remote from the air plenum intake opening.

8. The freezer arrangement of claim 7, wherein said exhaust duct is located adjacent the room ceiling.

9. The freezer arrangement of claim 8, wherein said exhaust duct includes a diffuser for diffusing chilled air dispensed therefrom.

10. The freezer arrangement of claim 9, wherein said storage area has a volume at least twice as large as the volume of the blast cell.

11. The freezer arrangement of claim 1, wherein said exhaust duct is located adjacent the room ceiling.

12. The freezer arrangement of claim 1, wherein said exhaust duct includes a diffuser for diffusing chilled air dispensed therefrom.

13. The freezer arrangement of claim 1, wherein said storage area has a volume at least twice as large as the volume of the blast cell.

14. A method for rapidly chilling unfrozen food product and for storing the same, including the steps of:

providing an enclosed room with a volume designated as a storage area and a volume designated as a blast cell, the volume of the storage area being larger than the volume of the blast cell;

providing an enclosed room with a volume designated as a storage area and a volume designated as a blast cell, the volume of the storage area being larger than the volume of the blast cell;

operating a refrigeration unit with an air intake located in the blast cell and a chilled air exhaust port located in the storage area, until the room reaches a predetermined storage temperature for storing a frozen food product;

loading unfrozen food product into the blast cell; and operating the refrigeration unit until the food product in the blast cell is cooled to a predetermined temperature.

15. The method of claim 14, further comprising the step of moving the cooled food product from the blast cell to the storage area for storage.

16. The method of claim 15, further comprising repeating the steps of loading unfrozen food product into the blast cell, operating the refrigeration unit and moving the cooled food product from the blast cell to the storage area for storage.

* * * * *